US011145334B2

(12) United States Patent
Chu et al.

(10) Patent No.: US 11,145,334 B2
(45) Date of Patent: Oct. 12, 2021

(54) COMPOSITE VIDEO FRAME REPLACEMENT

(71) Applicant: International Business Machines Corporation, Armonk, NY (US)

(72) Inventors: Zheng Ping AC Chu, Shanghai (CN); Fan Xiao Xin, Shanghai (CN); Yuan Jin, Shanghai (CN); Xi Xi Liu, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/555,008

(22) Filed: Aug. 29, 2019

(65) Prior Publication Data

US 2021/0065748 A1  Mar. 4, 2021

(51) Int. Cl.
*G11B 27/036* (2006.01)
*G06F 40/279* (2020.01)
*G06K 9/00* (2006.01)

(52) U.S. Cl.
CPC .......... *G11B 27/036* (2013.01); *G06F 40/279* (2020.01); *G06K 9/00718* (2013.01); *G06K 9/00765* (2013.01); *G06K 2209/01* (2013.01)

(58) Field of Classification Search
CPC .......... G06K 9/00718; G06K 9/00765; G06K 2209/01; G11B 27/036; G06F 40/279
See application file for complete search history.

(56) References Cited

U.S. PATENT DOCUMENTS

| 9,471,924 | B2 | 10/2016 | Garbow et al. |
| 9,620,168 | B1* | 4/2017 | Townsend ................. G06T 7/60 |
| 2011/0161999 | A1* | 6/2011 | Klappert ............ H04N 21/4755 |
| | | | 725/25 |
| 2014/0092043 | A1* | 4/2014 | de Leon ................ G06F 3/0488 |
| | | | 345/173 |

(Continued)

FOREIGN PATENT DOCUMENTS

| CN | 102253711 A | 11/2011 |
| CN | 107105310 A | 8/2017 |
| CN | 107590150 A | 1/2018 |

OTHER PUBLICATIONS

"Method and system for tracking the focus area of a presenter and displaying the same during video conference", An IP.com Prior Art Database Technical Disclosure, IP.com No. IPCOM000252958D, IP.com Electronic Publication Date: Feb. 23, 2018, 3 pages.

(Continued)

*Primary Examiner* — Thai Q Tran
*Assistant Examiner* — Jose M Mesa
(74) *Attorney, Agent, or Firm* — Nathan M. Rau (57) ABSTRACT

One or more frames within a video are segmented and classified according to information type. At least a portion of the information in the one or more frames is determined to be obscured. In response to this determination, information from audio data and the unobscured portion of the one or more frames is extracted. Using this extracted information, a set of replacement data is generated, according to the information type, for the obscured information in the one or more frames. The set of replacement data and the unobscured portion of the one or more frames is merged into one or more composite frames. These composite frames are displayed to a user.

14 Claims, 8 Drawing Sheets

(56) References Cited

U.S. PATENT DOCUMENTS

| | | | |
|---|---|---|---|
| 2017/0039867 A1* | 2/2017 | Fieldman | G11B 27/031 |
| 2017/0272818 A1* | 9/2017 | Gattis | H04N 21/4415 |
| 2017/0278135 A1* | 9/2017 | Majumdar | G06Q 30/0256 |
| 2018/0246695 A1* | 8/2018 | Taylor | H04N 21/4542 |
| 2019/0034787 A1* | 1/2019 | Knittel | G06K 9/6217 |
| 2019/0213212 A1* | 7/2019 | Adato | G06F 16/235 |
| 2019/0230387 A1* | 7/2019 | Gersten | H04N 21/8456 |
| 2019/0342426 A1* | 11/2019 | Momchilov | H04L 67/08 |

OTHER PUBLICATIONS

Mell et al., "The NIST Definition of Cloud Computing", Recommendations of the National Institute of Standards and Technology, U.S. Department of Commerce, Sep. 2011, 7 pages.

\* cited by examiner

COMPOSITE VIDEO FRAME REPLACEMENT

BACKGROUND

The present disclosure relates generally to the field of video enhancement, and more particularly to reconstructing obscured information in video frames.

Video feeds of live and other presentations have markedly increased the spread of information among professionals and the general population. Accurate and complete presentation of information contained in videos and livestreams may serve to enhance communication and collaboration.

SUMMARY

Embodiments of the present disclosure include a method, computer program product, and system for reconstructing obscured video information.

One or more frames within a video are segmented and classified according to information type. At least a portion of the information in the one or more frames is determined to be obscured. In response to this determination, information from audio data and the unobscured portion of the one or more frames is extracted. Using this extracted information, a set of replacement data is generated, according to the information type, for the obscured information in the one or more frames. The set of replacement data and the unobscured portion of the one or more frames is merged into one or more composite frames. These composite frames are displayed to a user.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of video enhancement, and more particularly to reconstructing obscured information in video frames. While the present disclosure is not necessarily limited to such applications, various aspects of the disclosure may be appreciated through a discussion of various examples using this context.

Individuals consume a great deal of video content in various forms, and a wide variety of industries specialize in and/or leverage online education and information dissemination. These informational videos often follow a format where an expert or other presenter provides information outlined in a slide deck (e.g., PowerPoint®) or other form of presentation software. At times, the information may be presented in hard copy (e.g., on a whiteboard or using poster material).

Regardless of the specific format and materials used, the efficiency and effectivity of the education and/or information dissemination may be impacted whenever the information presented is obscured in some fashion. For example, during presentations, it is not uncommon for a presenter to pace back and forth or otherwise block one or more viewers' line of sight to the projected information. Audience members may stand and block a camera's view of the presentation, the video angle may be less than optimal, etc. Whatever the reason for the obstruction, the quality of the presentation is impacted.

Utilizing audio and image structuring techniques (e.g., natural language processing (NLP), image recognition, etc.), a video may be analyzed to first determine whether any information in the video frame is obscured, and then to reconstruct the information so that a video viewer may access the obscured information. In embodiments, the obstruction may be filtered out completely. In yet other embodiments, the obstruction may become an interactive element within the video that may be "dragged" to a target location within the frame, thereby allowing the viewer to maintain visual contact with the obstruction while contemporaneously accessing the previously obscured information. This may be particularly helpful in embodiments where a presenter is the obstruction.

In embodiments, a video may be segmented into frames, and the frames may be classified. Video frames that are subsequent and/or preceding to the occurrence of an obstruction may be analyzed for the obscured information. In embodiments where an obstruction persists, it may be necessary to reconstruct the obscured information.

Slide decks may be analyzed for metadata and other clues as to the obscured information, and the audio data may be structured and analyzed to provide insight as to the obscured information. A presenter's gestures may also be analyzed. For example, a presenter may be pointing at a graph or chart while describing a specific area within the graph/chart. An intelligent reconstruction model or system may be capable of linking the presenter's audio to that region of the graph/chart during the video frames where the presenter's gesture to that region persists. In this way, an intelligent system may glean sufficient information to reconstruct any obscured portion of a video frame.

In embodiments, the intelligent system may employ both NLP techniques and image recognition techniques. The intelligent system may further employ one or more neural networking models. The neural networking models may be used in the information extraction process (e.g., NLP or image recognition) as well as in the replacement data generation process to create a reconstruction of the obscured information.

Once the obscured information is determined, it may be spliced back into the video frame(s) as a set of composite video frame(s). In embodiments, the obstruction may be removed completely, it may be transparent/translucent to one or more degrees, or the obstruction itself may be reformatted within the frame such that the obstruction may be moveable/interactive. In this way, the obstruction may be "clicked and dragged" to a target location within the video frame to allow a viewer/user to view both the obstruction and the reconstructed data that had previously been obscured.

Figure 1:
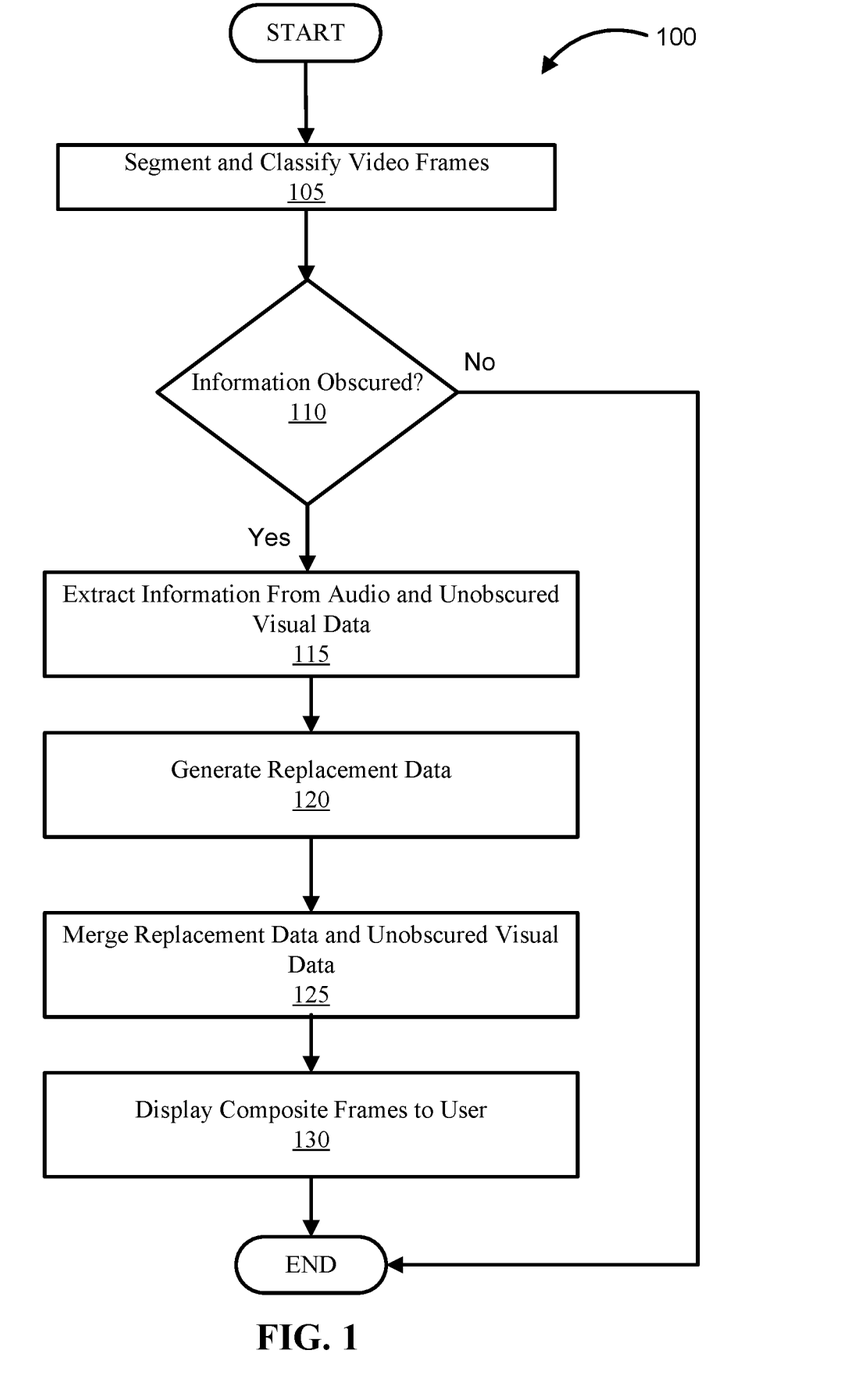
FIG. 1 illustrates a flowchart of a method for reconstructing obscured video information, in accordance with embodiments of the present disclosure.

Referring now to FIG. 1, illustrated is a flowchart of a method 100 for reconstructing obscured video information, in accordance with embodiments of the present disclosure. Method 100 may begin at 105, where video frames are segmented and classified. In embodiments, segmentation and classification may include, for example, isolation of individual video frames, parsing of elements within the video frames (e.g., lines of text, diagrams, individual/object identification, etc.), identification of elements within the video frames, etc. In embodiments, segmentation and classification may be performed using one or more neural networks. Neural networks are described in greater detail in the description of FIG. 4.

At 110, it is determined whether information within a given video frame is obscured. In embodiments, this may include a determination that a portion of text is obscured (e.g., a person or other obstruction is preventing a viewer from reading a word or phrase pictured in the video frame). In other embodiments, it may include a determination that a portion of a graphic, chart, graph, or other visual information is obscured. Image recognition techniques and neural network models, such as a convolutional neural network or a recursive neural network, may be employed, as well as optical character recognition (OCR) techniques, to determine whether an object or portion of text is obscured.

If no information obstruction is detected, the method may end. However, if an obstruction is detected, additional information may be extracted from the audio data of the video, as well as from the unobscured portion of the video frame at 115. In embodiments where a transcript of the audio is available, NLP techniques may be employed to structure the transcript and populate a relational database, triplestore, or textual index and provide a machine-readable transcript that can be used by a neural network or computing system to "understand" the topic and content of the transcript. In embodiments where no transcript is readily available, the audio data itself may be analyzed to produce such a transcript, which may subsequently be processed to provide a machine-readable transcript.

In embodiments, unobscured visual information in the video frame(s) may be analyzed to provide further clues regarding the obscured content/information. For example, in embodiments where text is at least partially unobscured, the unobscured text may be analyzed using OCR to determine the visible characters/words/phrases. In embodiments where a chart/graph or other visual, non-alphanumeric information is involved, a trained neural network may identify and analyze the unobscured visual elements to determine the nature and type of information displayed (e.g., a pie chart, bar graph, line graph, quarterly earnings report, etc.). In embodiments where a combination of text and non-alphanumeric elements are displayed, a plurality and/or combination of techniques may be employed to extract the available information.

At 120, replacement data is generated for the obscured information. In embodiments, a neural network or model may digest the extracted information to produce one or more candidates (e.g., options that are most likely to be suitable or identical replacements for the obscured information). In embodiments, a user may be presented with a set of likely candidates from which the user may select. In such embodiments, the user's input may be used to adjust and/or train a neural network's biases and/or weights.

For example, in embodiments involving obscured textual information, unobscured text from the video frame may be analyzed to determine the font size and spacing, and thereby the number of obscured characters may be assessed. NLP techniques may determine the topic and content of the unobscured text, which may inform the reconstruction process and narrow the number of likely words/phrases to be used in reconstruction. Looking to FIG. 3A as an example, two lines of text in video frame 310A have been partially obscured. The unobscured text may be analyzed to determine the topics of the video frame may, for example, include "Company A," "Company A's 'focus'," and "Company A's corporate presence." These topics may be used to look up additional information regarding Company A, for example on the Internet, and further populate a relational database or other NLP store and provide information that may aid in generating the replacement data. In embodiments, the sections of unobscured text at either side of the obscured information may be linked to NLP information transcribed from audio data, metadata within a slide deck, etc. to provide for a quicker and more accurate determination of candidates for replacement data.

Figure 3A:
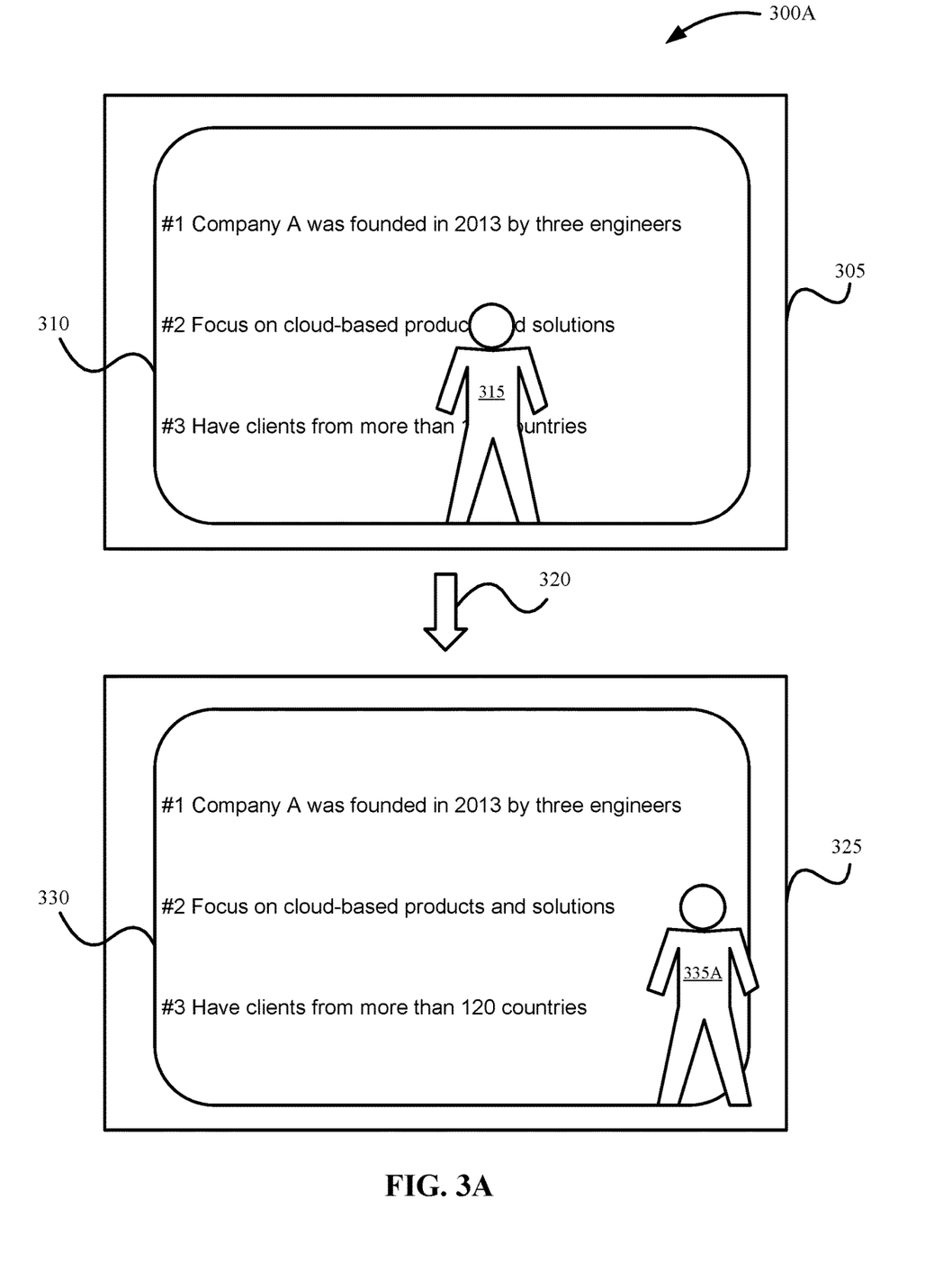
FIG. 3A illustrates an example of reconstructing obscured textual information, in accordance with embodiments of the present disclosure.

For example, it may be determined, using a relational database, that Company A's foci include "cloud-based products and solutions," "commercial interests," and "production techniques." The unobscured text may be analyzed to determine, based on the missing character count, that "cloud-based products and solutions" may contain the best candidate for replacing the obscured text from line #2 in video frame 310A.

In embodiments, the audio data may be transcribed and structured to inform the replacement data generation process. For example, a presenter may be reading the text, and the transcription may provide a word-for-word replacement for the obscured information. As another example, the presenter may provide other information that may be useful in determining/identifying the obscured words/characters. For example, the presenter may mention Company A by name, or the topic(s) of the presenter's audio data may allow for a better selection among the candidates for replacement data.

Once the replacement data is generated at 120, the replacement data and the unobscured visual data from the original video frame may be merged together at 125. This may include video layering and/or splicing to produce a composite video frame. In embodiments, the obstruction may be removed from the frame, it may be presented in a transparent or semi-transparent manner (e.g., the obscured text may be shown through the obstruction), or the obstruction may be spliced into the composite video frame in such a way that the user/viewer may drag the obstruction to another portion of the frame where it will no longer obstruct the information.

The composite video frame(s) may be displayed to the user at 130. This may include streaming the video to a user's device using the composite video frames, for example.

Figure 2:
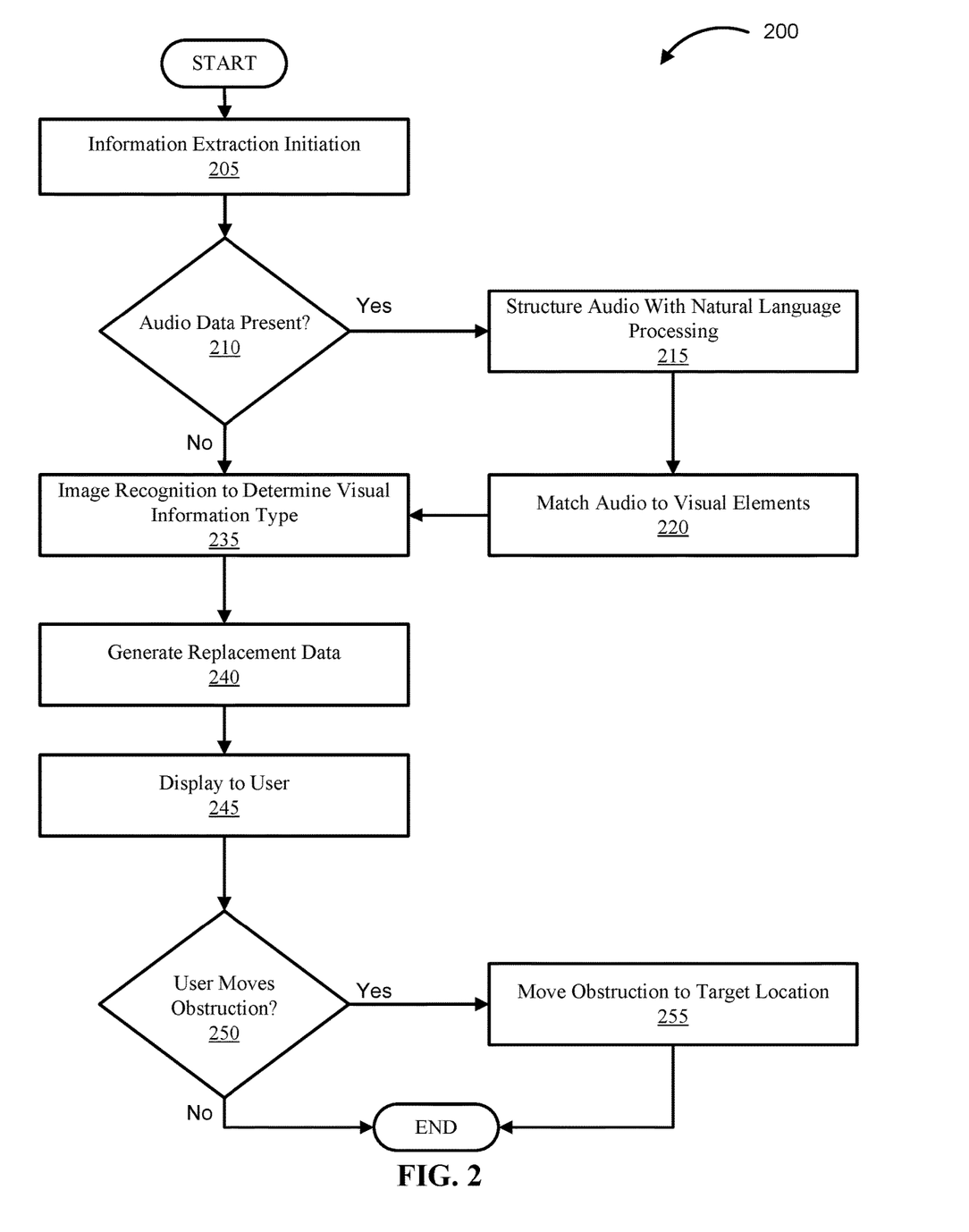
FIG. 2 illustrates a flowchart of a method for generating a set of replacement data to replace obscured information in video frames, in accordance with embodiments of the present disclosure.

Referring now to FIG. 2, illustrated is a flowchart of a method 200 for generating a set of replacement data to replace obscured information in video frames, in accordance with embodiments of the present disclosure. Method 200 may begin at 205 where information extraction has been initiated. 205 may be substantially similar to, for example, 115 of FIG. 1.

In response to the initiation of information extraction at 205, it may be determined whether audio data is present in the video at 210. If the video contains audio data, the audio may be transcribed and/or structured using NLP techniques at 215, as described herein.

At 220, the extracted and structured audio information may be matched to visual elements within the video frame(s). The matching may include, for example, the syncing of extracted audio information to textual information depicted within the video frame. In embodiments, the matching may be word-for-word, or it may be according to topic and/or sentiment. In yet other embodiments, the matching may consider any gestures a presenter may make in the video frame(s) to pair the extracted audio information to the text and/or visual elements in the region of the video frame(s) at which the presenter was gesturing.

At 235, image recognition techniques may be employed to determine the type of visual information contained within the video frame(s). For example, as described herein, the video frame(s) may contain a graph, infographic, bar chart, line graph, or other visual information type.

Once the visual information type has been determined at 235, a set of replacement data may be generated at 240. Using FIG. 3B as an example, the visual information type may be, in embodiments, a bar graph where one or more of the bars has been obscured. Image recognition techniques may determine that a bar within a bar graph has been obscured and may use slide deck metadata and/or audio data to regenerate an appropriate bar for the bar graph.

Figure 3B:
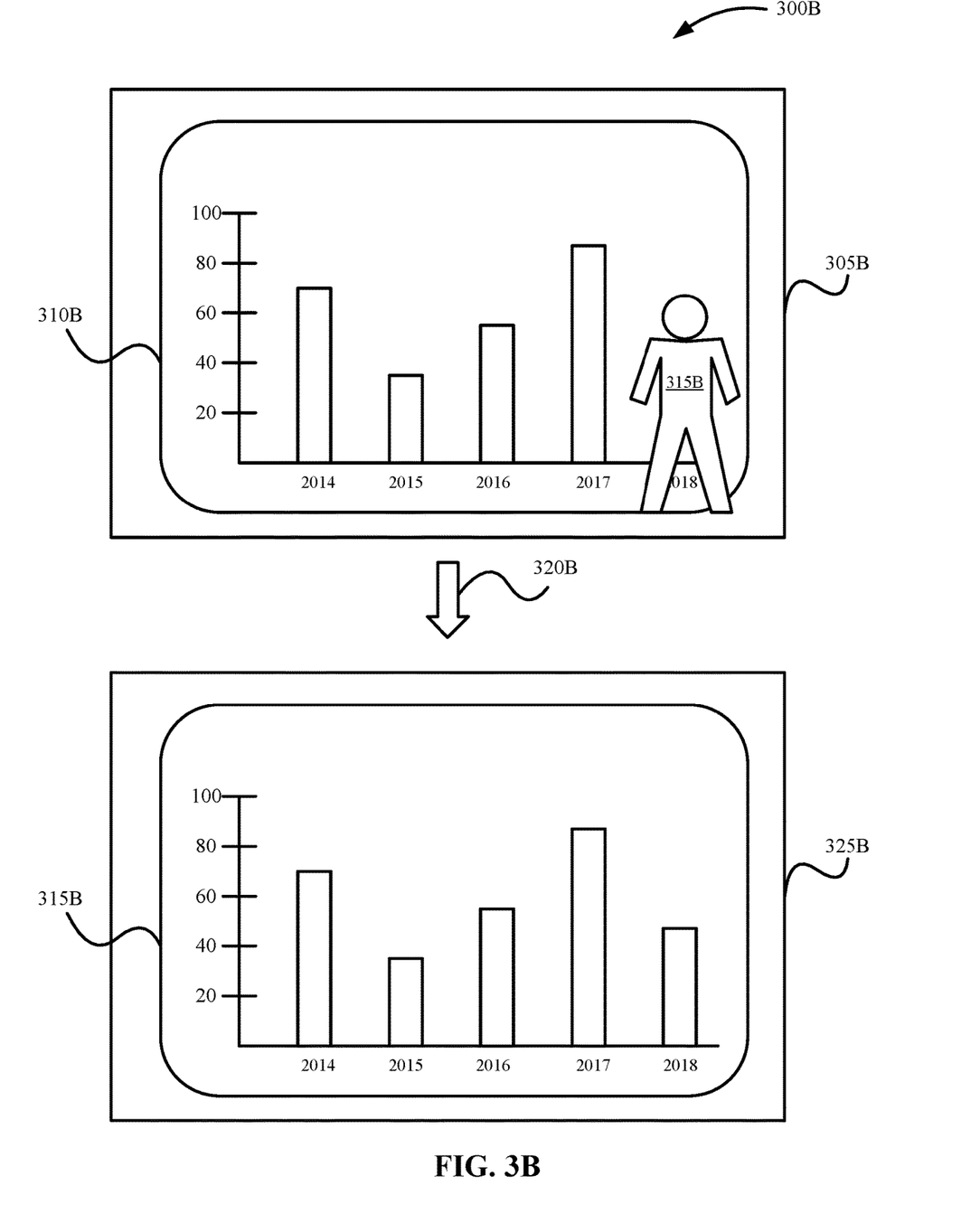
FIG. 3B illustrates an example of reconstructing obscured diagrammatic information, in accordance with embodiments of the present disclosure.

For example, the audio from the video may indicate that the last bar contains information regarding the year 2018, and that the bar represents a score of "45." A neural networking model may reconstruct the obscured portion of the bar graph, relative to the other bars and the Y-axis of the graph, to label and create an appropriately-sized bar at the position where the information for year 2018 should be. In embodiments, the model may account for the spacing among the visual elements (e.g., in this case, bars), any colors used within the video frame, etc.

Once the set of replacement data has been generated at 240, the composite video frame may be presented to the user at 245. In embodiments, the obstruction may be automatically removed, or, as depicted by method 200, the user may be given the option to move the obstruction at 250.

If, at 250, the user does not move the obstruction, the method 200 may end. In embodiments, the obstruction may, alternatively, be automatically reformatted within the video frame to become transparent or "ghost-like."

If, however, the user moves the obstruction at 250 (e.g., using click-and-drag, verbal instruction, or otherwise inputting an appropriate command), the obstruction may be moved to a target location at 255. A target location may be user-defined (e.g., click-and-drag) or it may be a predefined location or set of locations, among which a user may choose.

Referring now to FIG. 3A, depicted is an example 300A of reconstructing obscured textual information, in accordance with embodiments of the present disclosure. A user may perceive a viewable area 305 of a video. Within the viewable area 305, a presentation 310 may include textual information, and a presenter 315 may be present. As pictured in viewable area 305, presenter 315 is obscuring a portion of the textual information.

Arrow 320 may represent the processes described with regard to FIGS. 1 and 2. These processes may result in, for example, composite frame(s) for viewable area 325. Viewable area 325 depicts a composite video frame where a user may have clicked-and-dragged the obstruction (here, presenter 335A) to a target location to the right of the originally-obscured text in presentation 330.

Referring now to FIG. 3B, illustrated is an example 300B of reconstructing obscured diagrammatic information, in accordance with embodiments of the present disclosure. A user may perceive a viewable area 305B of a video. Within the viewable area 305B, a presentation 310B may include visual diagrammatic information (e.g., a bar graph), and a presenter 315B may be present. As pictured in viewable area 305B, presenter 315B is obscuring a portion of the diagram.

Arrow 320B may represent the processes described with regard to FIGS. 1 and 2. These processes may result in, for example, viewable area 325B. Viewable area 325B depicts a composite video frame where an obstruction has been automatically removed (here, presenter 315B) from the composite video frame(s) containing presentation 315B.

Figure 4:
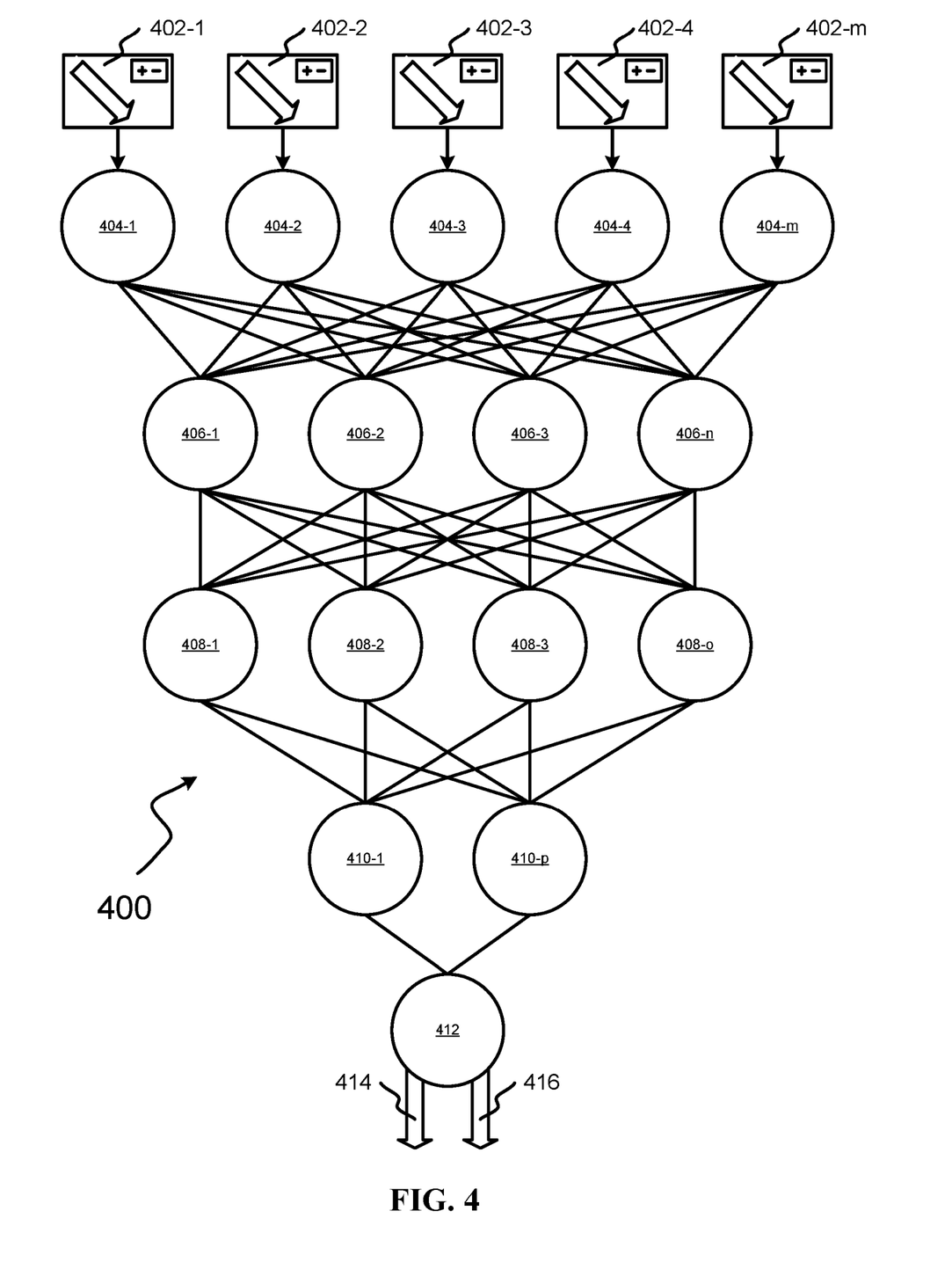
FIG. 4 illustrates an example neural network that may be specialized to reconstruct obscured information, in accordance with embodiments of the present disclosure.

FIG. 4 depicts an example neural network 400 that may be specialized to extract information from audio data, extract visual information from unobscured portions of video frames, or to reconstruct obscured information in video frames. Inputs may include, for example, audio data, slide deck metadata, and visual information within video frames. In embodiments, neural network 400 may be a classifier-type neural network. Neural network 400 may be part of a larger neural network. For example, neural network 400 may be nested within a single, larger neural network, connected to several other neural networks, or connected to several other neural networks as part of an overall aggregate neural network.

It is contemplated that the neural network 400 may be implemented, in part or in whole, as part of a larger cloud computing system. In embodiments, neural network 400 may be communicatively coupled, at least intermittently, via a network (not shown). Such a network, as contemplated herein, may be any type or combination of other networks. For example, a network may include any combination of personal area network (PAN), local area network (LAN), metropolitan area network (MAN), wide area network (WAN), wireless local area network (WLAN), storage area network (SAN), enterprise private network (EPN), or virtual private network (VPN). In some embodiments, a network may refer to an IP network, a conventional coaxial-based network, etc. For example, neural network 400 may communicate with various devices (e.g. tablets, laptops, smartphones, portable terminals, video streaming devices, etc.) over the Internet.

In some embodiments, a network can be implemented within a cloud computing environment or using one or more cloud computing services. Consistent with various embodiments, a cloud computing environment may include a network-based, distributed data processing system that provides one or more cloud computing services. Further, a cloud computing environment may include many computers (e.g., hundreds or thousands of computers or more) disposed within one or more data centers and configured to share resources over a network. Cloud computing is discussed in greater detail in regard to FIGS. 5 & 6.

Inputs 402-1 through 402-*m* represent the inputs to neural network 400. In this embodiment, 402-1 through 402-*m* do not represent different inputs. Rather, 402-1 through 402-*m* represent the same input that is sent to each first-layer neuron (neurons 404-1 through 404-*m*) in neural network 400. In some embodiments, the number of inputs 402-1 through 402-*m* (i.e., the number represented by m) may equal (and thus be determined by) the number of first-layer neurons in the network. In other embodiments, neural network 400 may incorporate 1 or more bias neurons in the first layer, in which case the number of inputs 402-1 through 402-*m* may equal the number of first-layer neurons in the network minus the number of first-layer bias neurons. In some embodiments, a single input (e.g., input 402-1) may be input into the neural network. In such an embodiment, the first layer of the neural network may comprise a single neuron, which may propagate the input to the second layer of neurons.

Inputs 402-1 through 402-*m* may comprise one or more artifact component(s) and a relative composition that is associated with a compositional artifact. For example, inputs 402-1 through 402-*m* may comprise 10 components with their relative compositions that are associated with a seed artifact. In other embodiments, not all components and their relative compositions may be input into neural network 400. For example, in some embodiments, 30 components may be input into neural network 400, but relative compositions for only 20 components may be input into neural network 400.

Neural network 400 may comprise 5 layers of neurons (referred to as layers 404, 406, 408, 410, and 412, respectively corresponding to illustrated nodes 404-1 to 404-*m*, nodes 406-1 to 406-*n*, nodes 408-1 to 408-*o*, nodes 410-1 to 410-*p*, and node 412). In some embodiments, neural network 400 may have more than 5 layers or fewer than 5 layers. These 5 layers may each be comprised of the same number of neurons as any other layer, more neurons than any other layer, fewer neurons than any other layer, or more neurons than some layers and fewer neurons than other layers. In this embodiment, layer 412 is treated as the output layer. Layer 412 outputs a probability that a target event will occur, and contains only one neuron (neuron 412). In other embodiments, layer 412 may contain more than 1 neuron. In this illustration no bias neurons are shown in neural network 400. However, in some embodiments each layer in neural network 400 may contain one or more bias neurons.

Layers 404-412 may each comprise an activation function. The activation function utilized may be, for example, a rectified linear unit (ReLU) function, a SoftPlus function, a Soft step function, or others. Each layer may use the same activation function, but may also transform the input or output of the layer independently of or dependent upon the ReLU function. For example, layer 404 may be a "dropout" layer, which may process the input of the previous layer (here, the inputs) with some neurons removed from processing. This may help to average the data, and can prevent overspecialization of a neural network to one set of data or several sets of similar data. Dropout layers may also help to prepare the data for "dense" layers. Layer 406, for example, may be a dense layer. In this example, the dense layer may process and reduce the dimensions of the feature vector (e.g., the vector portion of inputs 402-1 through 402-*m*) to eliminate data that is not contributing to the prediction. As a further example, layer 408 may be a "batch normalization" layer. Batch normalization may be used to normalize the outputs of the batch-normalization layer to accelerate learning in the neural network. Layer 410 may be any of a dropout, hidden, or batch-normalization layer. Note that these layers are examples. In other embodiments, any of layers 404 through 410 may be any of dropout, hidden, or batch-normalization layers. This is also true in embodiments with more layers than are illustrated here, or fewer layers.

Layer 412 is the output layer. In this embodiment, neuron 412 produces outputs 414 and 416. Outputs 414 and 416 represent complementary probabilities that a target event will or will not occur. For example, output 414 may represent the probability that a target event will occur, and output 416 may represent the probability that a target event will not occur. In some embodiments, outputs 414 and 416 may each be between 0.0 and 1.0, and may add up to 1.0. In such embodiments, a probability of 1.0 may represent a projected absolute certainty (e.g., if output 414 were 1.0, the projected chance that the target event would occur would be 100%, whereas if output 416 were 1.0, the projected chance that the target event would not occur would be 100%).

In embodiments, FIG. 4 illustrates an example probability-generator neural network with one pattern-recognizer pathway (e.g., a pathway of neurons that processes one set of inputs and analyzes those inputs based on recognized patterns, and produces one set of outputs). However, some embodiments may incorporate a probability-generator neural network that may comprise multiple pattern-recognizer pathways and multiple sets of inputs. In some of these embodiments, the multiple pattern-recognizer pathways may be separate throughout the first several layers of neurons, but may merge with another pattern-recognizer pathway after several layers. In such embodiments, the multiple inputs may merge as well (e.g., several smaller vectors may merge to create one vector). This merger may increase the ability to identify correlations in the patterns identified among different inputs, as well as eliminate data that does not appear to be relevant.

In embodiments, neural network 400 may be trained/adjusted (e.g., biases and weights among nodes may be calibrated) by inputting feedback and/or input from a user to correct/force the neural network to arrive at an expected output. In embodiments, the impact of the feedback on the weights and biases may lessen over time, in order to correct for inconsistencies among user(s). In embodiments, the degradation of the impact may be implemented using a half-life (e.g., the impact degrades by 50% for every time interval of X that has passed) or similar model (e.g., a quarter-life, three-quarter-life, etc.).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service deliver for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources, but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure, but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities, but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
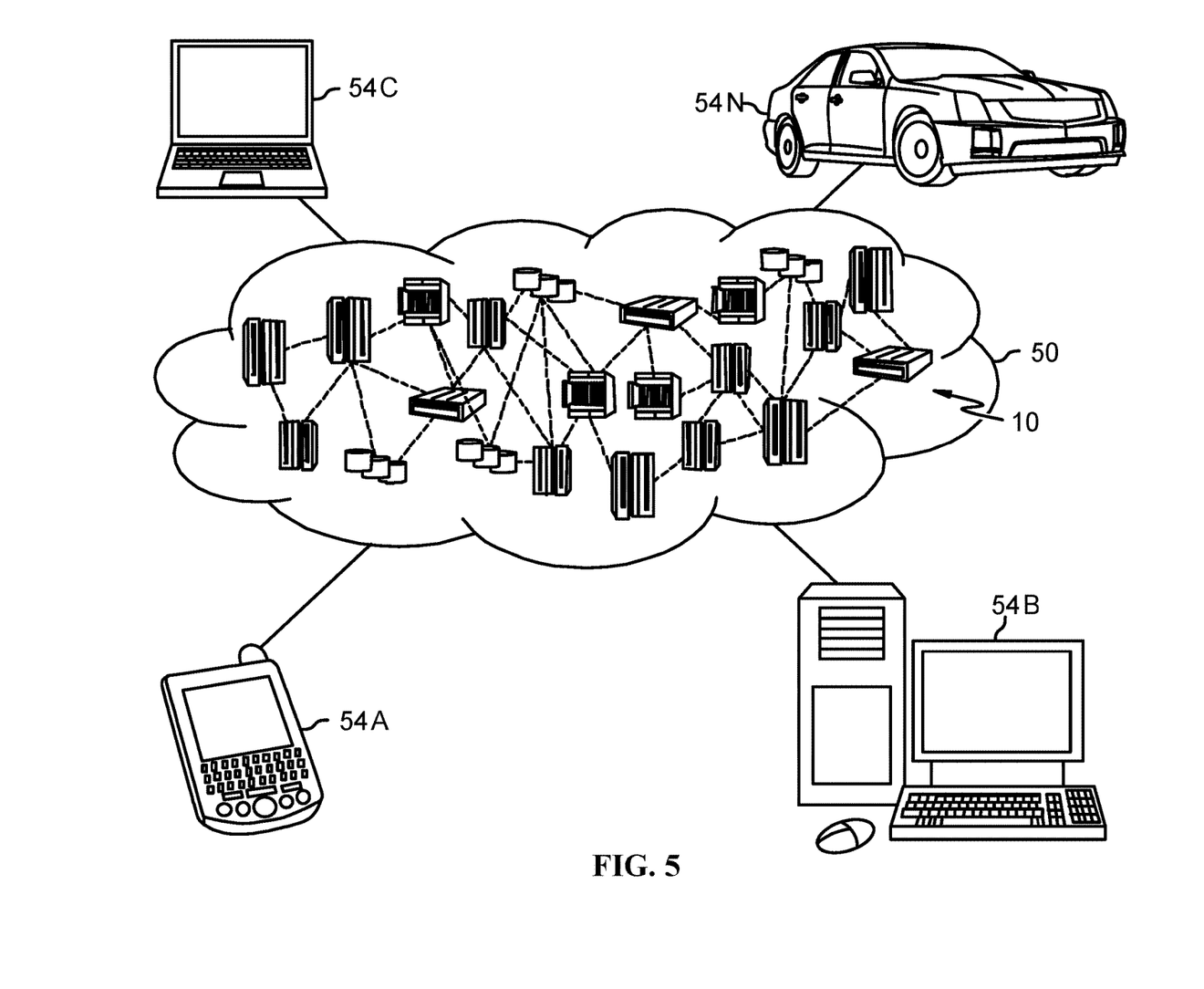
FIG. 5 depicts a cloud computing environment according to an embodiment of the present disclosure.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
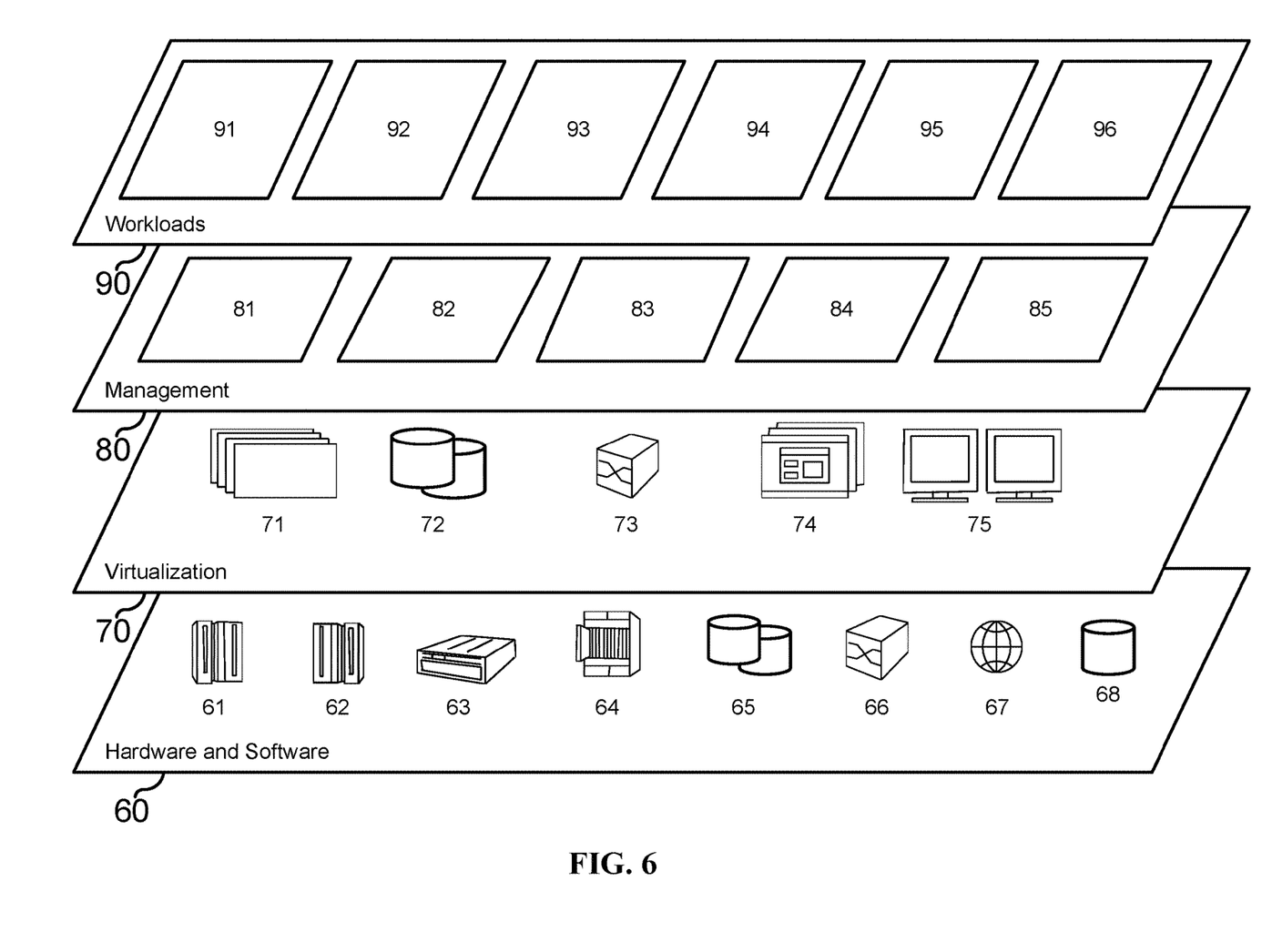
FIG. 6 depicts abstraction model layers according to an embodiment of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and reconstructing obscured information in video frames 96.

Figure 7:
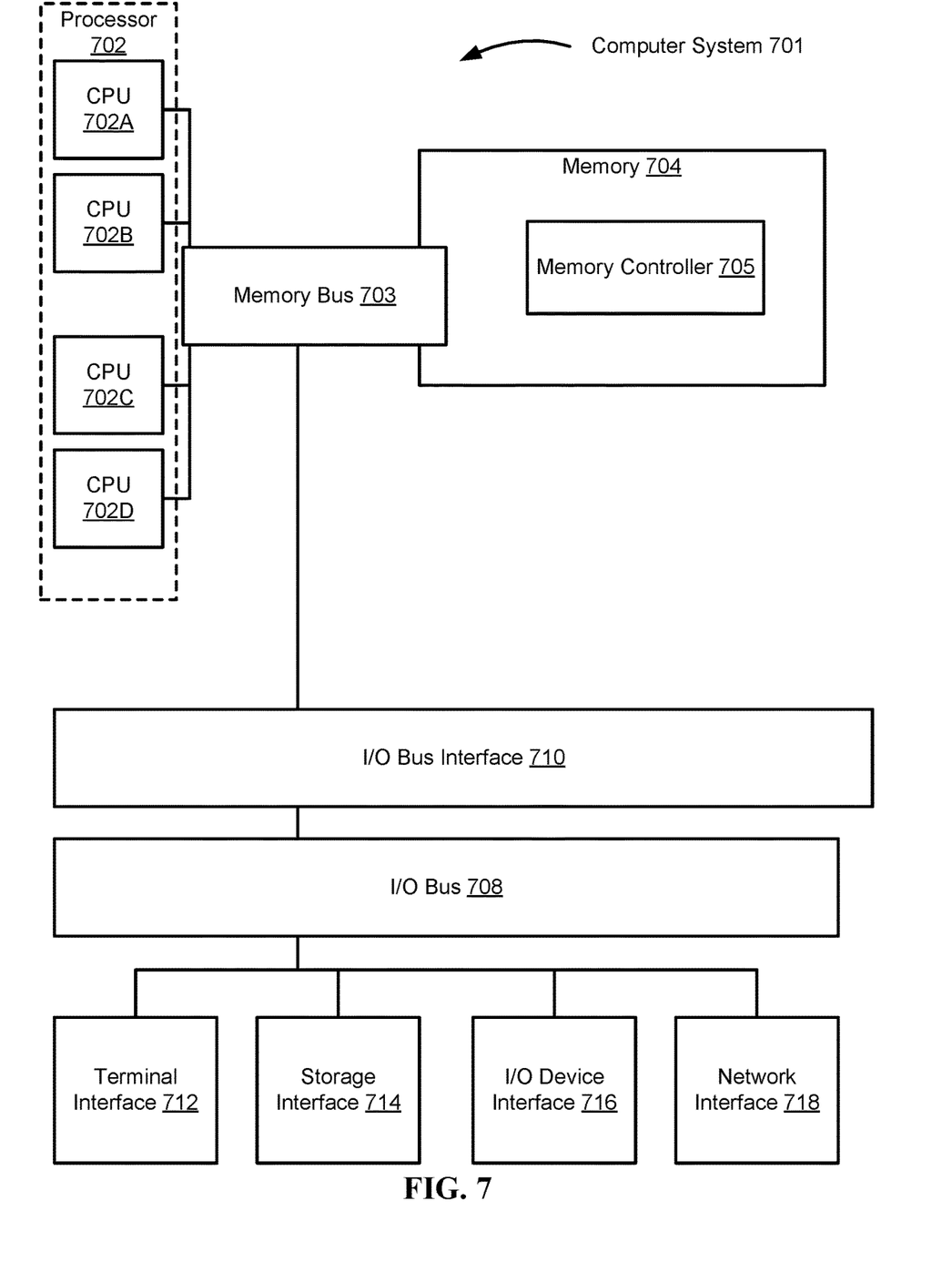
FIG. 7 illustrates a high-level block diagram of an example computer system that may be used in implementing embodiments of the present disclosure.

Referring now to FIG. 7, shown is a high-level block diagram of an example computer system 701 that may be configured to perform various aspects of the present disclosure, including, for example, methods 100/200, described in FIGS. 1 and 2, respectively. The example computer system 701 may be used in implementing one or more of the methods or modules, and any related functions or operations, described herein (e.g., using one or more processor circuits or computer processors of the computer), in accordance with embodiments of the present disclosure. In some embodiments, the major components of the computer system 701 may comprise one or more CPUs 702, a memory subsystem 704, a terminal interface 712, a storage interface 714, an I/O (Input/Output) device interface 716, and a network interface 718, all of which may be communicatively coupled, directly or indirectly, for inter-component communication via a memory bus 703, an I/O bus 708, and an I/O bus interface unit 710.

The computer system 701 may contain one or more general-purpose programmable central processing units (CPUs) 702A, 702B, 702C, and 702D, herein generically referred to as the CPU 702. In some embodiments, the computer system 701 may contain multiple processors typical of a relatively large system; however, in other embodiments the computer system 701 may alternatively be a single CPU system. Each CPU 702 may execute instructions stored in the memory subsystem 704 and may comprise one or more levels of on-board cache.

In some embodiments, the memory subsystem 704 may comprise a random-access semiconductor memory, storage device, or storage medium (either volatile or non-volatile) for storing data and programs. In some embodiments, the memory subsystem 704 may represent the entire virtual memory of the computer system 701, and may also include the virtual memory of other computer systems coupled to the computer system 701 or connected via a network. The memory subsystem 704 may be conceptually a single monolithic entity, but, in some embodiments, the memory subsystem 704 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. In some embodiments, the main memory or memory subsystem 704 may contain elements for control and flow of memory used by the CPU 702. This may include a memory controller 705.

Although the memory bus 703 is shown in FIG. 7 as a single bus structure providing a direct communication path among the CPUs 702, the memory subsystem 704, and the I/O bus interface 710, the memory bus 703 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 710 and the I/O bus 708 are shown as single respective units, the computer system 701 may, in some embodiments, contain multiple I/O bus interface units 710, multiple I/O buses 708, or both. Further, while multiple I/O interface units are shown, which separate the I/O bus 708 from various communications paths running to the various I/O devices, in other embodiments some or all of the I/O devices may be connected directly to one or more system I/O buses.

In some embodiments, the computer system 701 may be a multi-user mainframe computer system, a single-user system, or a server computer or similar device that has little or no direct user interface, but receives requests from other computer systems (clients). Further, in some embodiments, the computer system 701 may be implemented as a desktop computer, portable computer, laptop or notebook computer, tablet computer, pocket computer, telephone, smart phone, mobile device, or any other appropriate type of electronic device.

It is noted that FIG. 7 is intended to depict the representative major components of an exemplary computer system 701. In some embodiments, however, individual components may have greater or lesser complexity than as represented in FIG. 7, components other than or in addition to those shown in FIG. 7 may be present, and the number, type, and configuration of such components may vary.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for reconstructing obscured video information, the method comprising:
for one or more frames within a video generated by a camera, segmenting and classifying the one or more frames according to visual information type;
determining at least a portion of the information in the one or more frames is obscured by an obstruction between the camera and the information;
in response to the determination, extracting information from audio data and the unobscured portion of the one or more frames;
linking, via a relational database, the extracted audio data to the obscured information in the one or more frames;
using the extracted information and the relational database, generating a set of replacement data, according to visual information type, for the obscured information in the one or more frames, wherein metadata associated with the one or more frames is used to generate at least a portion of the set of replacement data, and wherein the linked extracted audio data is transcribed into a word-for-word replacement for a second portion of the set of replacement data;

merging the set of replacement data and the unobscured portion of the one or more frames into one or more composite frames;

displaying the one or more composite frames to a user;

receiving, from the user, an indication to move an obstruction within the video to a target location in the one or more composite frames, wherein the obstruction is a presenter; and displaying, to the user, the one or more composite frames, wherein the obstruction is displayed at the target location, and wherein the replacement data is displayed at the original location of the obstruction.

2. The method of claim 1, wherein the obscured information is a set of alphanumeric textual data.

3. The method of claim 1, wherein the obscured information is a set of non-alphanumeric visual data.

4. The method of claim 1, wherein the obscured information is a combination of alphanumeric textual data and non-alphanumeric visual data, and wherein visual information type includes a graph a bar chart, an infographic, and a line graph.

5. The method of claim 4, wherein a portion of the information extraction is performed using natural language processing and optical character recognition techniques, wherein a set of gestures made by a presenter within the one or more frames is used to determine the obscured portion and to associate audio data with the obscured portion.

6. The method of claim 5, wherein the set of replacement data is generated using a neural network.

7. The method of claim 6, wherein generating the set of replacement data includes adjusting a weight and a bias of one or more neural network edges.

8. The method of claim 7, wherein the method enables unilaterally provisioning computing capabilities in a cloud environment.

9. A system for reconstructing obscured video information, comprising:

a memory with program instructions included thereon; and a processor in communication with the memory, wherein the program instructions cause the processor to:

for one or more frames within a video generated by a camera, segment and classify the one or more frames according to visual information type;

determine at least a portion of the information in the one or more frames is obscured by an obstruction between the camera and the information;

in response to the determination, extracting information from audio data and the unobscured portion of the one or more frames;

linking, via a relational database, the extracted audio data to the obscured information in the one or more frames;

using the extracted information and the relational database, generating a set of replacement data, according to visual information type, for the obscured information in the one or more frames, wherein metadata associated with the one or more frames is used to generate at least a portion of the set of replacement data, and wherein the linked extracted audio data is transcribed into a word-for-word replacement for a second portion of the set of replacement data;

merging the set of replacement data and the unobscured portion of the one or more frames into one or more composite frames;

displaying the one or more composite frames to a user;

receiving, from the user, an indication to move an obstruction within the video to a target location in the one or more composite frames, wherein the obstruction is a presenter; and displaying, to the user, the one or more composite frames, wherein the obstruction is displayed at the target location, and wherein the replacement data is displayed at the original location of the obstruction.

10. The system of claim 9, wherein the obscured information is a set of alphanumeric textual data.

11. The method of claim 9, wherein the obscured information is a set of non-alphanumeric visual data.

12. A computer program product for reconstructing obscured video information, the computer program product comprising a non-transitory computer readable storage medium having program instructions embodied therewith, the program instructions executable by a device to cause the device to:

for one or more frames within a video generated by a camera, segment and classify the one or more frames according to visual information type;

determine at least a portion of the information in the one or more frames is obscured by an obstruction between the camera and the information;

in response to the determination, extracting information from audio data and the unobscured portion of the one or more frames;

linking, via a relational database, the extracted audio data to the obscured information in the one or more frames;

using the extracted information and the relational database, generating a set of replacement data, according to visual information type, for the obscured information in the one or more frames, wherein metadata associated with the one or more frames is used to generate at least a portion of the set of replacement data, and wherein the linked extracted audio data is transcribed into a word-for-word replacement for a second portion of the set of replacement data;

merging the set of replacement data and the unobscured portion of the one or more frames into one or more composite frames;

displaying the one or more composite frames to a user;

receiving, from the user, an indication to move an obstruction within the video to a target location in the one or more composite frames, wherein the obstruction is a presenter; and displaying, to the user, the one or more composite frames, wherein the obstruction is displayed at the target location, and wherein the replacement data is displayed at the original location of the obstruction.

13. The computer program product of claim 12, wherein the obscured information is a set of alphanumeric textual data.

14. The computer program product of claim 12, wherein the obscured information is a set of non-alphanumeric visual data.

* * * * *